United States Patent

Lampl et al.

[11] Patent Number: 5,556,656
[45] Date of Patent: Sep. 17, 1996

[54] INJECTION MOULDING MACHINE

[75] Inventors: Alfred Lampl; Heinz Leonhartsberger, both of Schwertberg; Otto Urbanek, Linz; Gerhard Wimbauer, Schwertberg; Helmut Naderhirn, Perg, all of Austria

[73] Assignee: Engel Maschinenbau Gesellschaft GmbH, Schwertberg, Austria

[21] Appl. No.: 411,743

[22] PCT Filed: Aug. 11, 1994

[86] PCT No.: PCT/AT94/00112

§ 371 Date: Apr. 6, 1995

§ 102(e) Date: Apr. 6, 1995

[87] PCT Pub. No.: WO95/04643

PCT Pub. Date: Feb. 16, 1995

[30] Foreign Application Priority Data

Aug. 11, 1993 [AT] Austria ................................. 1601/93
Sep. 2, 1993 [AT] Austria ................................. 1763/93

[51] Int. Cl.⁶ ............................................. B29C 45/64
[52] U.S. Cl. .................. 425/589; 425/450.1; 425/451.9
[58] Field of Search .................... 425/589, 451.9, 425/450.1

[56] References Cited

U.S. PATENT DOCUMENTS 3,111,053 11/1963 Svensson.
3,386,324 6/1968 Ihle.
3,829,266 8/1974 Melcher.
5,249,951 10/1993 Leonhartsberger et al. ......... 425/451.9

FOREIGN PATENT DOCUMENTS 0311133 10/1988 European Pat. Off..
0543773 5/1993 European Pat. Off..
1133677 4/1957 France.
9212480 11/1992 Germany.

*Primary Examiner*—Tim Heitbrink
*Attorney, Agent, or Firm*—Notaro & Michalos PC

[57] ABSTRACT

An injection moulding machine has a framework (1), a fixed and a movable die platen (2, 8) and at least a piston-cylinder unit of a cylinder platen (3) that bears a hydraulic or electromechanical closure mechanism. The cylinder platen (3) and the fixed die platen (2) are interconnected only by the framework (1). The closure force exerted during injection moulding and the vertical thrust between the cylinder platen (3) and the die platen (2) are transmitted only through the framework (1). The intersection between the longitudinal center axis (LSK) of the closing die (5) and the longitudinal center axis (LBF) of the die platen (8) lies at the back of the movable die platen (8) and the point at which the force of the closing die (5) is transmitted to the movable die platen (8) is vertically displaceable in relation to the die platen (8).

22 Claims, 14 Drawing Sheets

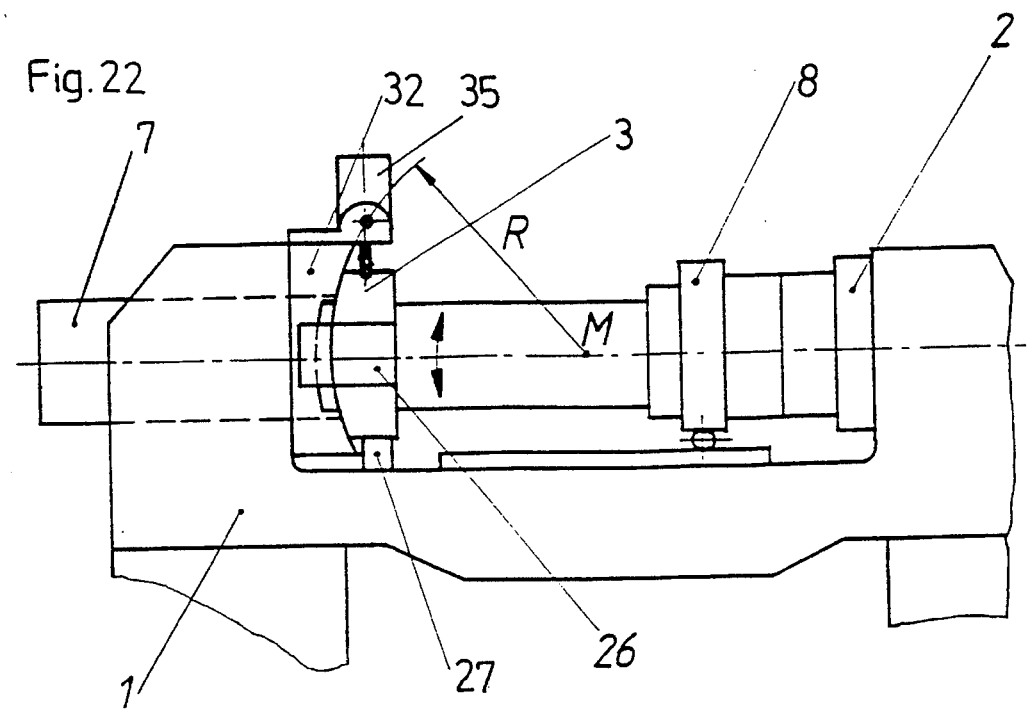
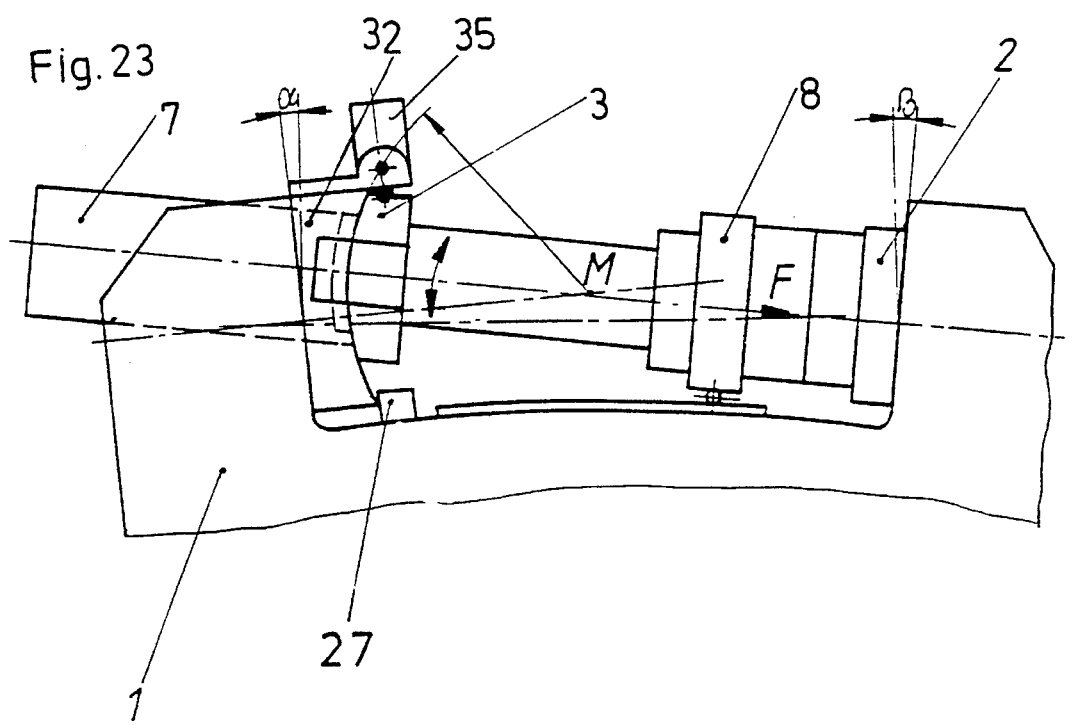

5,556,656

INJECTION MOULDING MACHINE

FIELD AND BACKGROUND OF THE INVENTION

The invention relates to an injection moulding machine with a machine frame, one stationary and one moveable die platen and, carried on an end plate of the machine frame, a hydraulic or electro-mechanical closing mechanism which is provided with a closing piston moveable with respect to the end plate, with which closing mechanism the moveable die platen can be displaced on guide rails provided on the machine frame, wherein the end plate upon which the moveable die is supported and the stationary die platen are connected exclusively by means of the machine frame and the die platens locked together are inclined, under the influence of the closing force, slightly out of a plane perpendicular to the machine frame, and a hinge is provided near to the closing piston which joins together a hinge part assigned to the machine frame and a hinge part assigned to the moveable die platen.

An injection moulding machine of this type is known from EP-B1-0 311 133. Injection moulding machines without transoms offer better access to the moulding tool, whereby for example the time required for dismantling can be substantially reduced. As a whole they are distinguished by free access to the tool area, the possibility of using bulky tools, by better use of the machines and by the possibility of using automatic tool changers.

It has been shown that when there is a very high degree of build-up of closing force, the stationary die platen and the end plate upon which the closing mechanism is supported are pushed apart from one another. In order that the moveable die platen can optimally match up with the stationary die platen, it not only has to perform a tilting movement, but also a movement along its vertical plane.

SUMMARY OF THE INVENTION

The object of the invention is to provide a mounting for the moveable die platen which makes it possible in a simple, cost effective manner for it to match the movement of the stationary die platen and thereby guarantees an absolutely sealed moulding tool.

The object according to the invention is solved in that when hinged, in addition to a tilting movement the hinge part belonging to the moveable die platen performs a radial displacement relative to the machine frame, preferably directed approximately normally with respect to the longitudinal axis of the machine.

By means of the embodiment according to the invention the closing force always acts normally upon the interface of the tool, whereby the absolute sealing of the tool during the injection process is ensured.

An injection moulding machine without a transom of this type can naturally be configured as a horizontal machine as well as a vertical machine.

The closing mechanism according to the invention can also be used advantageously in transfer moulding presses and moulding press machines.

Different embodiments of the invention will hereafter be described in more detail with reference to the attached drawings. The embodiments shown concern horizontal machines and injection moulding machines.

BRIEF DESCRIPTION OF THE DRAWINGS

FIGS. 18 to 23 show analogous views to FIGS. 10, 11 and 14, 17, wherein a drive apparatus is provided which supports or effects the displacement of the hinge part assigned to the moveable die platen.

DESCRIPTION OF THE PREFERRED EMBODIMENTS

Figure 1:
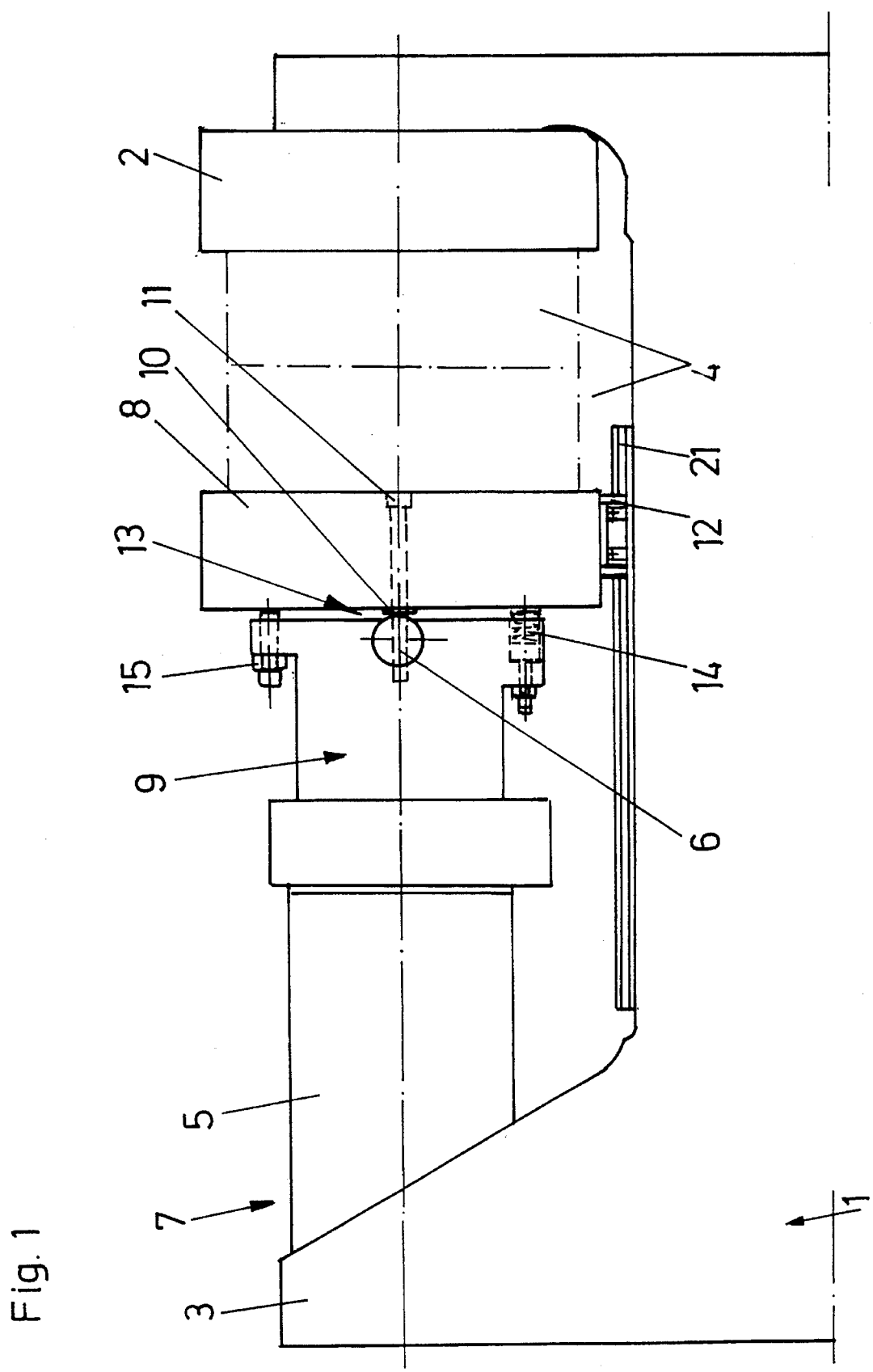
FIG. 1 shows a side view of an injection moulding machine according to the invention.

The load-bearing machine frame 1 is provided with two cheeks which are made from a single piece together with the machine frame 1, and supports the stationary die platen 2 and the end or cylinder plate 3. The end or cylinder plate 3 can also be configured in a single piece with the machine frame 1. The machine frame 1 is advantageously fitted onto a base frame 22. The base frame 22 and the machine frame I could also be made from a single piece, however. The machine frame 1 is preferably made from heavy plate (ST.52.3). The stationary die platen 2 is fixed onto the machine frame and carries one half of a tool 4.

The substantive part according to the invention of the injection moulding machine is the machine frame 1 which is manufactured integrally with the stationary die platen 2 and the cylinder plate 3. That is to say the die platen 2 and the cylinder plate 3 are moulded onto or mounted in a fixed manner onto the machine frame 1.

The injection unit, with the feed hopper for supplying the granulate, is mounted near the die platen 2.

The injection unit will not be described further in this context as it is not the subject-matter of the invention, and is manufactured according to the state of the art.

The cylinder plate 3 carries a piston-cylinder unit 7, the piston 5 of which is connected to the moveable die platen 8 and forms the closing mechanism.

The moveable die platen 8 also carries one half of a moulding tool 4.

During the moulding process the half-mould 4 of the moveable die platen 8 is held against the half mould 4 of the stationary die platen 2 by means of the piston-cylinder unit 7.

In a closing unit in which a high degree of closing force is transferred without a transom exclusively by the frame 1, gaping open could occur in the upper area of the tool, that is to say between the two half-moulds 4.

According to the invention in the embodiments in FIGS. 1 to 8 a hinge 13 without an axle is therefore provided between the piston 5 of the piston-cylinder unit 7 and the moveable die platen 8. The moveable die platen 8 with its half-mould 4 can lie parallel against the stationary die platen 2 with the mould half 4 belonging thereto during a high degree of closing force by means of this hinge 13 without an axle.

Figure 2:
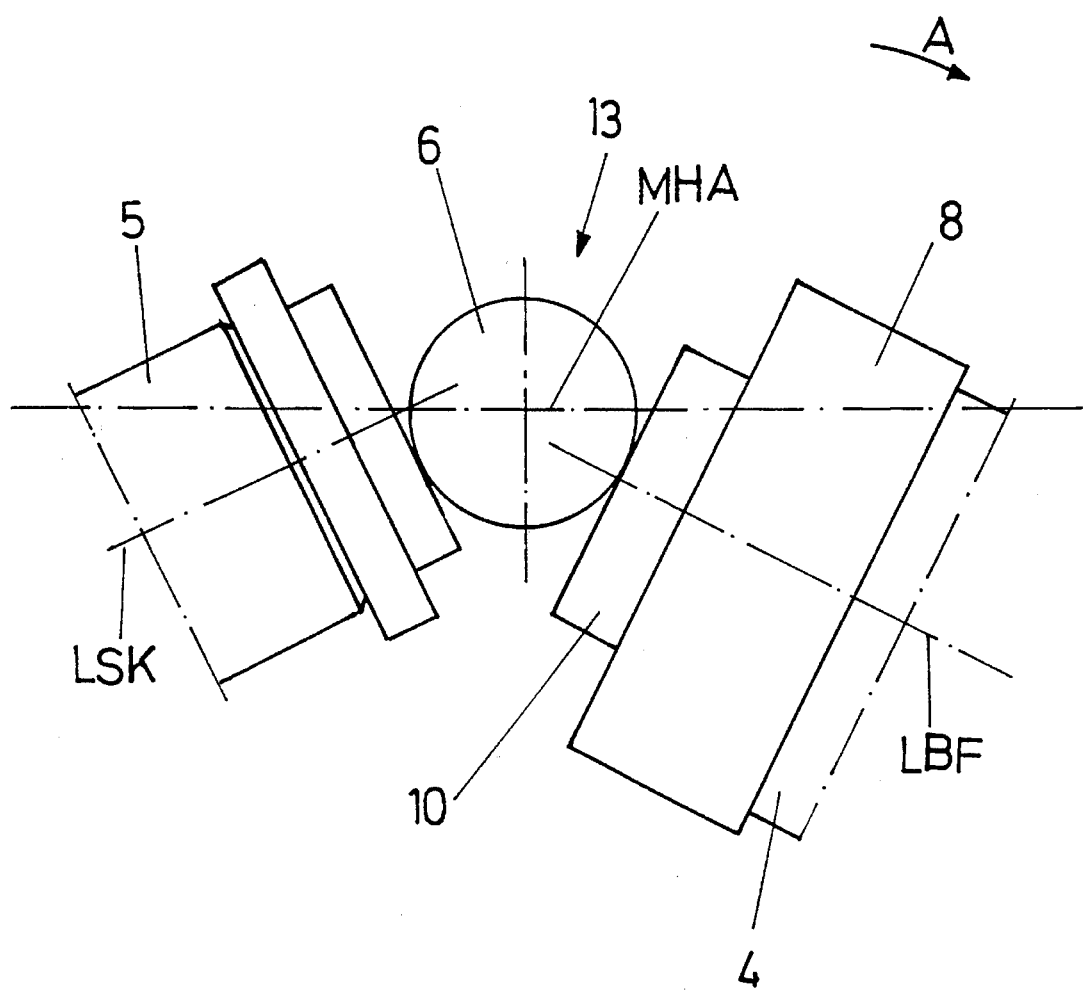
FIG. 2 shows schematically and in an exaggerated manner the deflection of the longitudinal axes of the closing cylinder and the moveable mould carrying platen from the main axis of the machine during a high degree of build-up of closing force.
Figure 3:
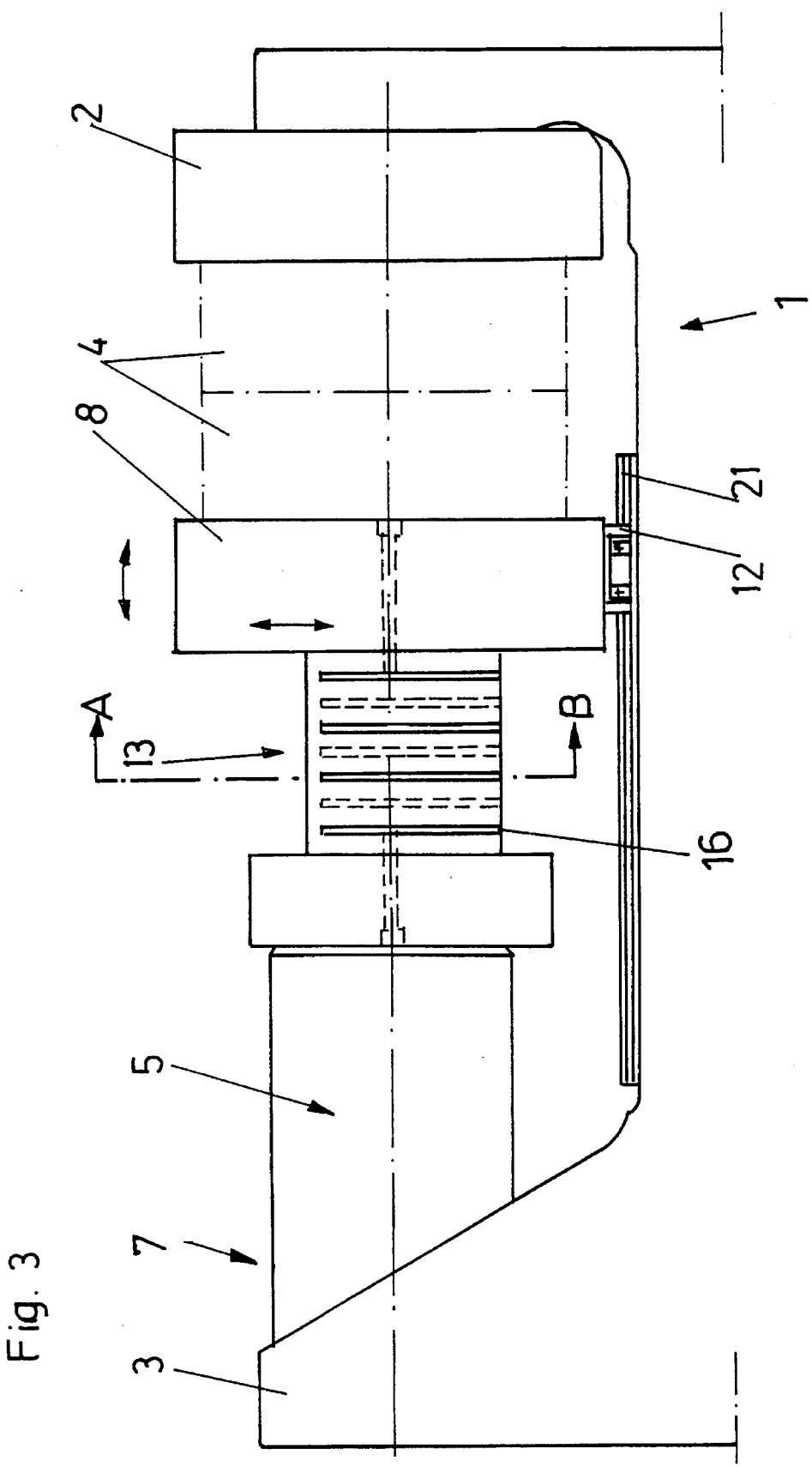
FIG. 3 shows a side view of a further embodiment of an injection moulding machine according to the invention.
Figure 4:
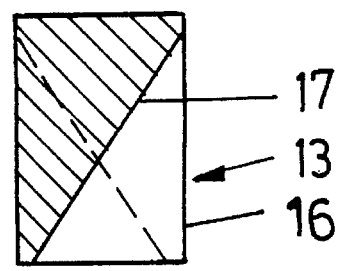
FIG. 4 shows a section according to the line A-B in FIG. 3.
Figure 5:
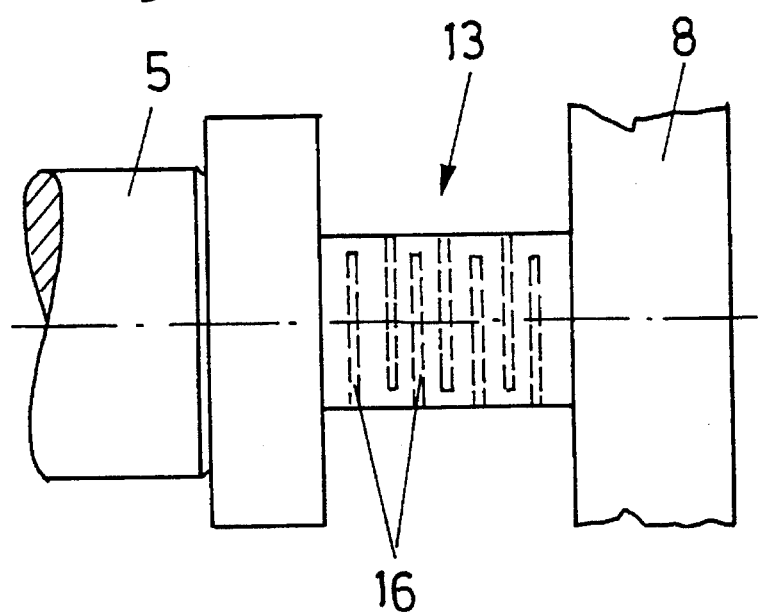
FIG. 5 shows the view 1 in FIG. 3.
Figure 6:
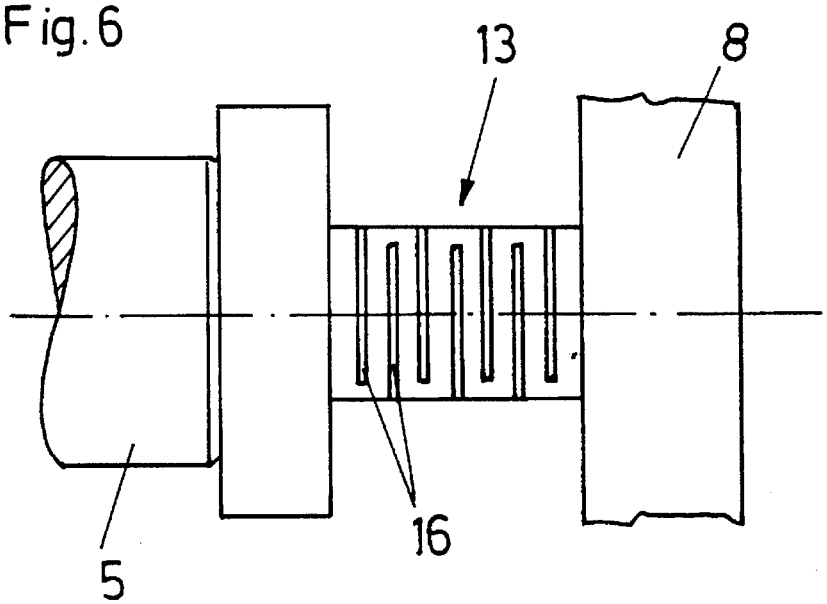
FIG. 6 shows claim 2 of FIG. 3.
Figure 8:
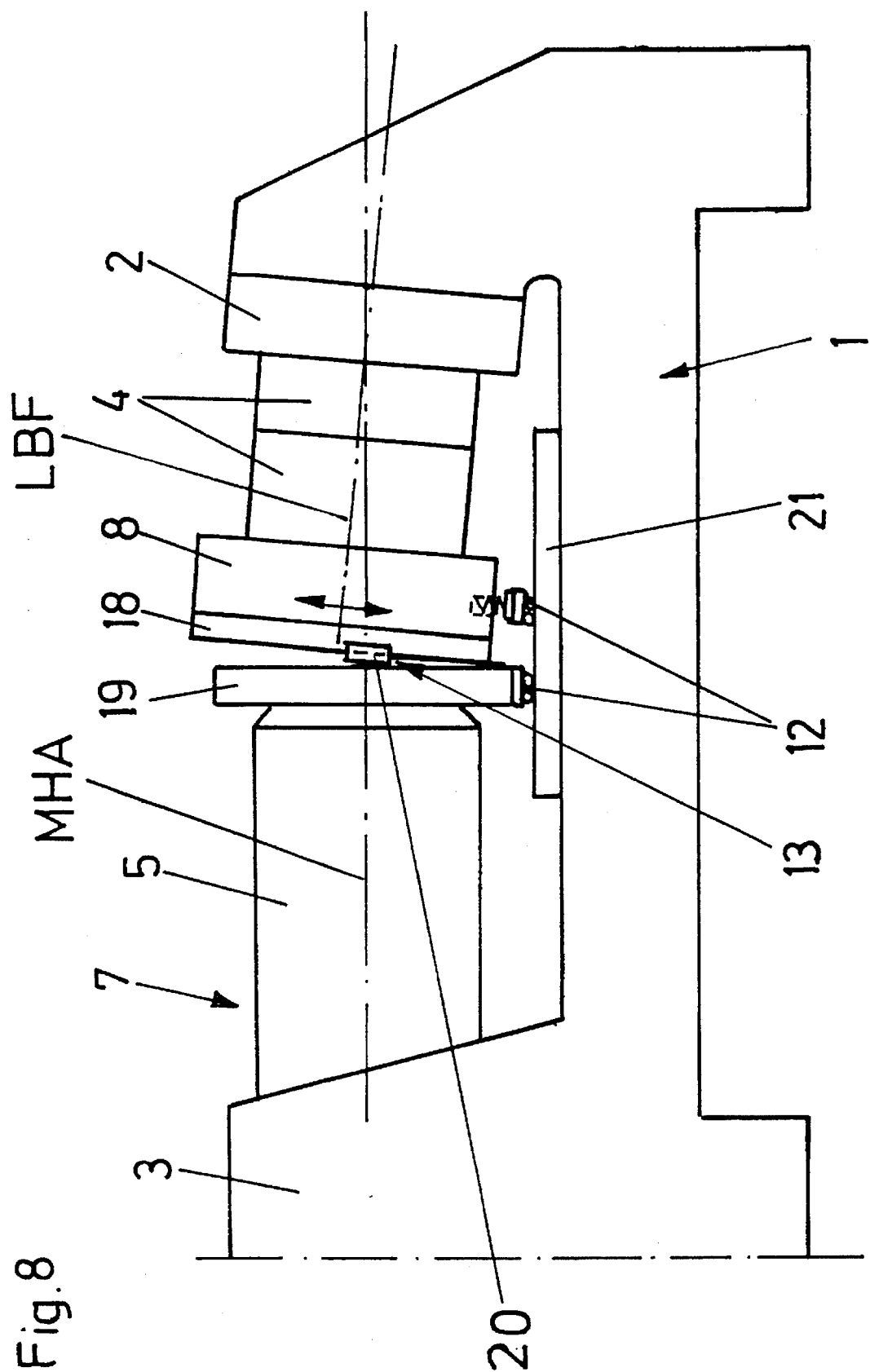
FIG. 8 shows, again greatly exaggerated, a side view of this injection moulding machine under a high degree of closing pressure.
Figure 9:
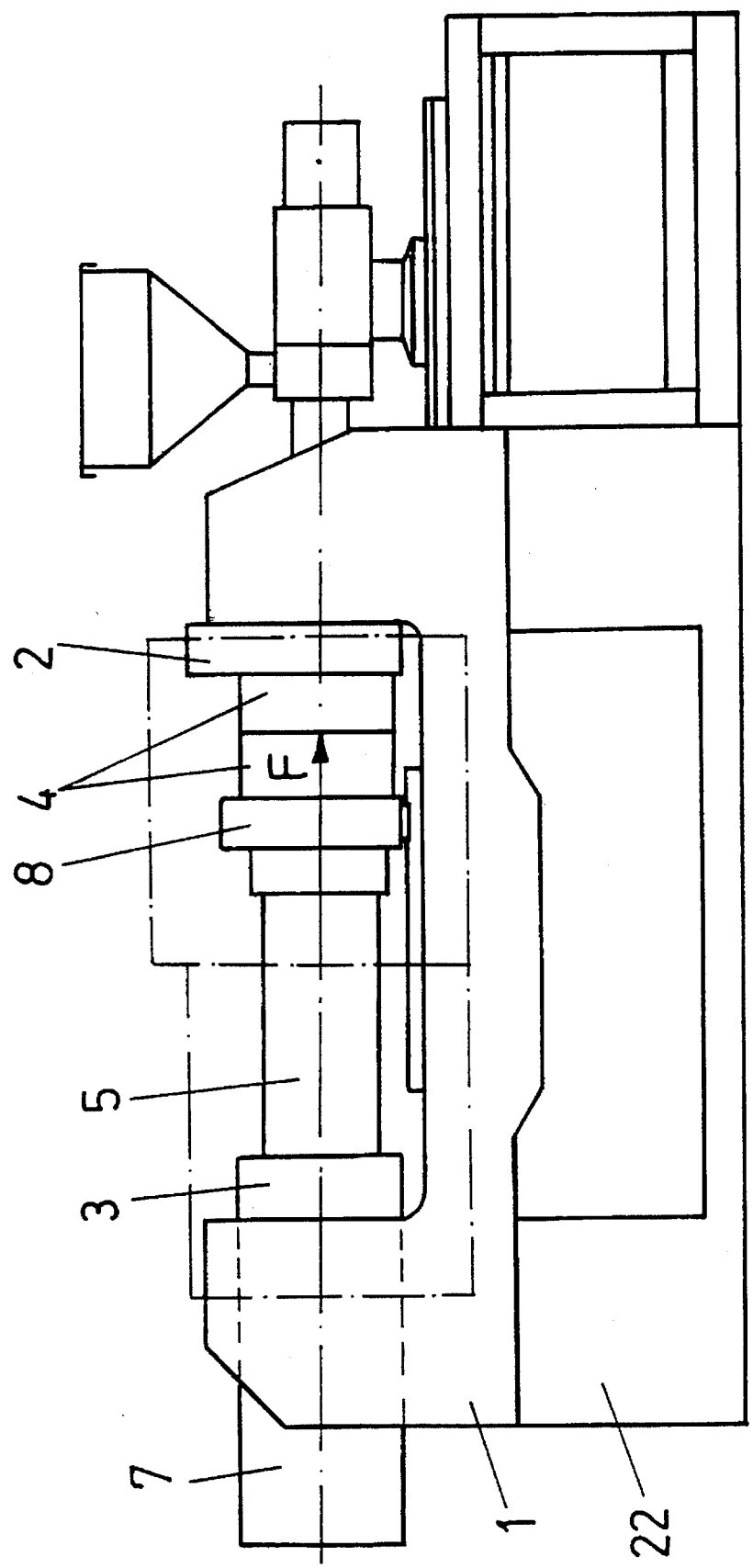
FIG. 9 shows schematically the side view of an injection moulding machine without a transom.

As shown in FIGS. 2 and 8, by means of the hinge 13 the moveable die platen 8 can be inclined and displaced at the same time so that the parallelism of the platens is retained even when the stationary die platen 2 is deflected backwards.

As long as no closing pressure is built up the longitudinal axis LSK of the closing piston 5 and the longitudinal axis LBF of the moveable die platen 8 are in a straight line with the main axis MHA of the machine. Under closing pressure the stationary die platen 2 is deflected in the direction of the arrow A in FIGS. 2 and 8. This movement can also be made by the moveable die platen 8 with its half-mould 4 in order to retain parallelism and a sealed mould. The longitudinal axis LSK of the closing cylinder 5 and the longitudinal axis LBF of the moveable die platen 8 are thereby deflected from the main axis MHA of the machine, and each form an angle with respect to it. The three axes LSK, LBF and MHA do not however meet at one point as they do not perform a purely tilting movement. The longitudinal axis LSK of the closing piston 5 and the longitudinal axis LBF of the moveable die platen 8 are not only tilted but also displaced in relation to the main axis MHA of the machine.

In order to make this movement possible the hinge 13 is configured as a hinge without an axle. In the embodiment according to FIG. 1 the hinge 13 has a rolling element 6 which is mounted in a coupling part 9. The coupling part 9 is connected to the closing piston 5 of the piston-cylinder unit 7. The rolling element 6 projects from the coupling part 9 far enough so that the moveable die platen 8 with the press plate 10 can be supported thereon. The moveable die platen 8 is connected to the coupling part 9 by means of one or more bolts 11.

The moveable die platen 8 is guided on rails 21 by means of bearing shoes 12. Although the bearing shoes 12 are held on the rails 21 by means of form fitting, they do however allow a short, elastic lifting off of the die platen 8 during a very high degree of closing pressure.

The amount of movement of the lifting off and tilting movement of the moveable die platen 8 is within a range which can also be carried out by the bolts 11. The elasticity of conventional steel bolts is sufficient for this.

A return spring 14 is mounted on the coupling part 9 which ensures that when the mould is open the moveable die platen is again returned to the vertical position. The coupling part 9 also carries a mechanically adjustable stop 15, for example an adjusting bolt, with which the inclination of the moveable die platen 8 can be set.

In the embodiment according to FIGS. 3 to 6 the hinge 13 is formed by a coupling part with a rectangular cross-section which is provided with slits 16 directed in opposite directions to one another. The slits 16 each extend over approximately half of the cross-sectional area, with a diagonal groove base 17. By means of the slits 16 the hinge 13 forming the coupling part is naturally to a very great extent tiltable in the manner of a concertina and can be compressed so that under closing pressure the moveable die platen 8 carries out a movement according to the two arrows in FIG. 3. That is to say the moveable die platen 8 is tilted about a horizontal axis and simultaneously also lifted off of the rails 21.

Figure 7:
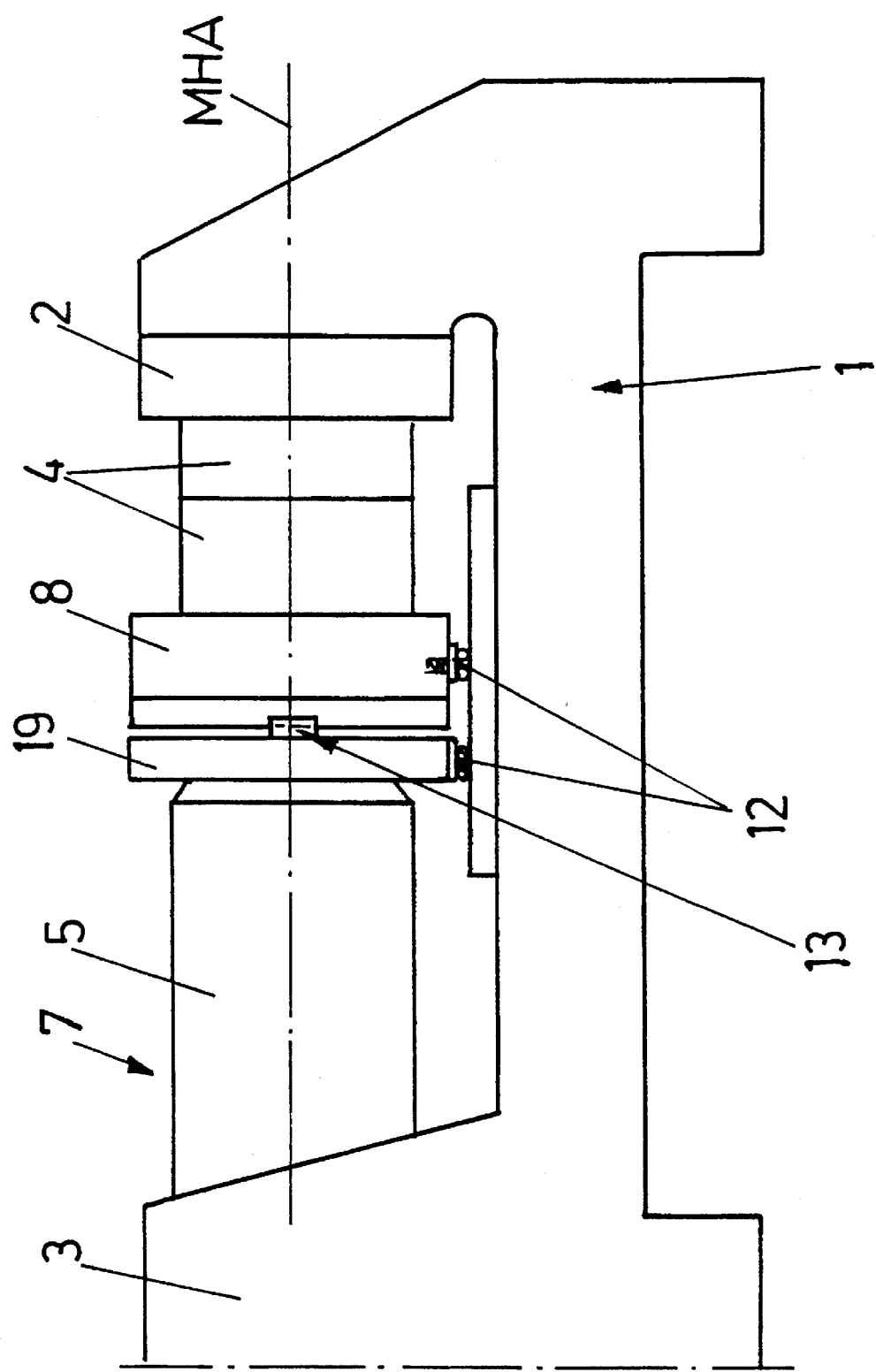
FIG. 7 shows a side view of a further embodiment of an injection moulding machine according to the invention.

In the embodiment according to FIGS. 7 and 8, the moveable die platen 8 is provided on its rear with one or more vertical rails 18. The coupling part 19 of the closing cylinder 5 carries a bearing shoe 20 which surrounds the rail 18 in a manner similar to the bearing shoe 12 and the rail 21. It allows the rail 18 to tilt slightly with respect to the coupling part 19 to which it is coupled. Advantageously the bearing shoe 20 is provided with self-adjusting ball-type nipples and the rail 18 is configured in an undulating manner.

Both the coupling part 19 and the moveable die platen 8 can be displaced, as described with reference to the previous embodiments, by bearing shoes 12 on rails 21. The bearing shoe 12 again allows slight tilting and lifting off of the moveable die platen 8 and possibly of the coupling part 19 with respect to the rails 21.

Figure 10:
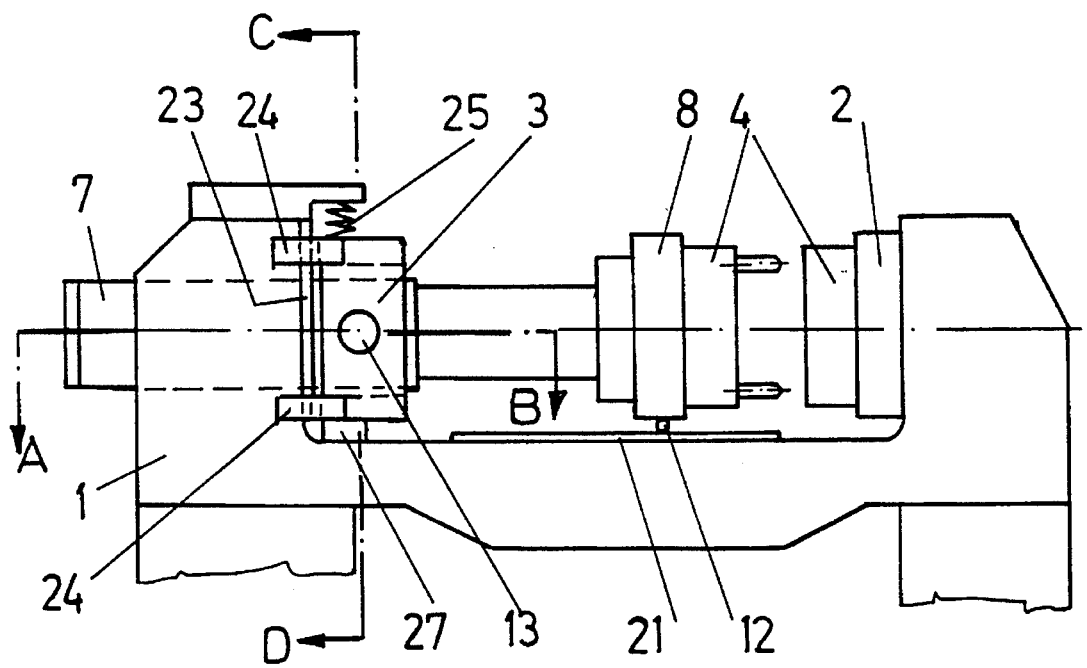
FIG. 10 shows schematically a side view of the closing device when the tool is open.
Figure 11:
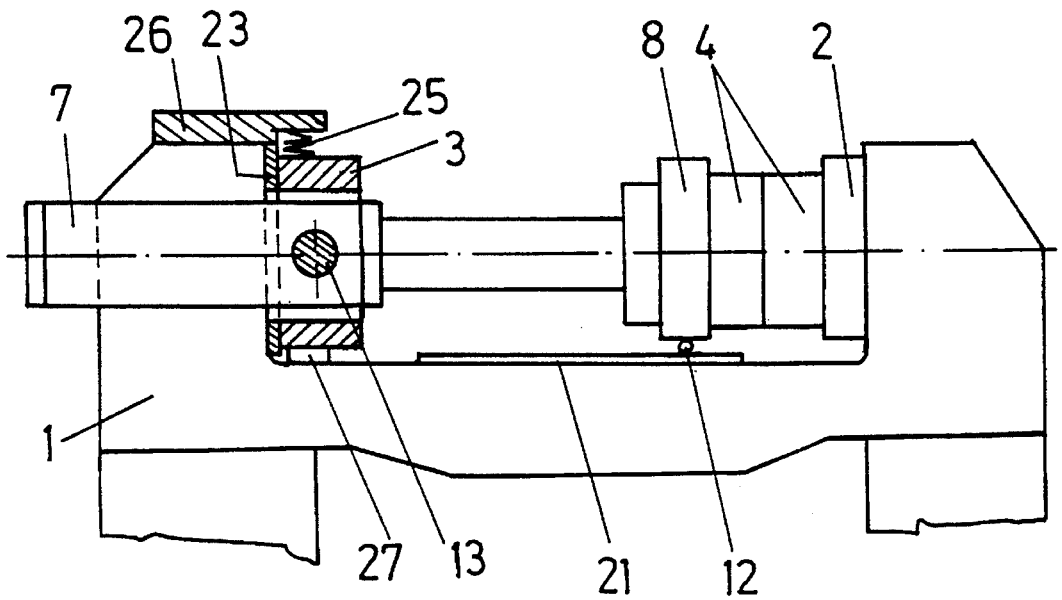
FIG. 11 shows a side view of the closing device when the mould is closed without build-up of the full closing force.
Figure 12:
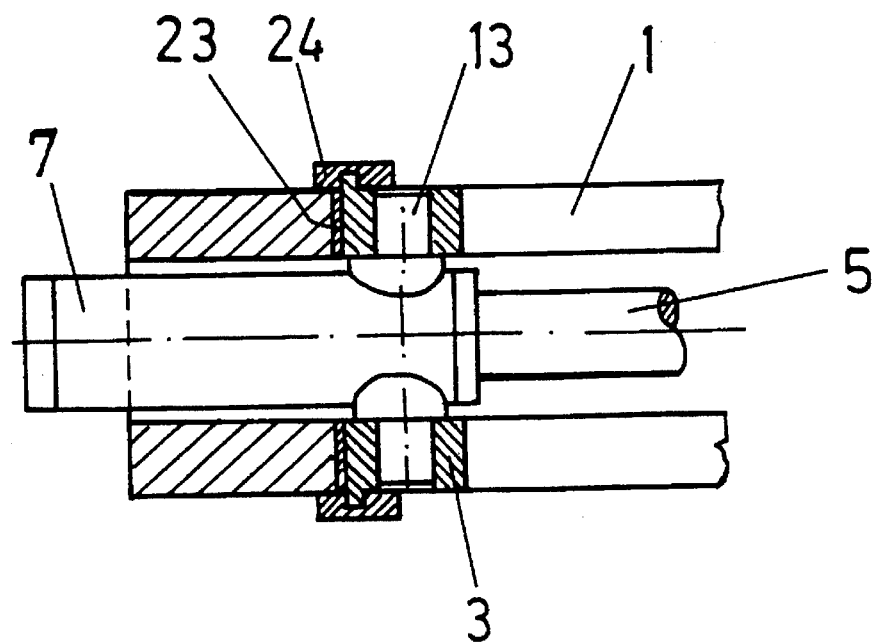
FIGS. 12 and 13 show a rotatable mounting of the closing cylinder of the piston-cylinder unit in the cylinder plate.
Figure 13:
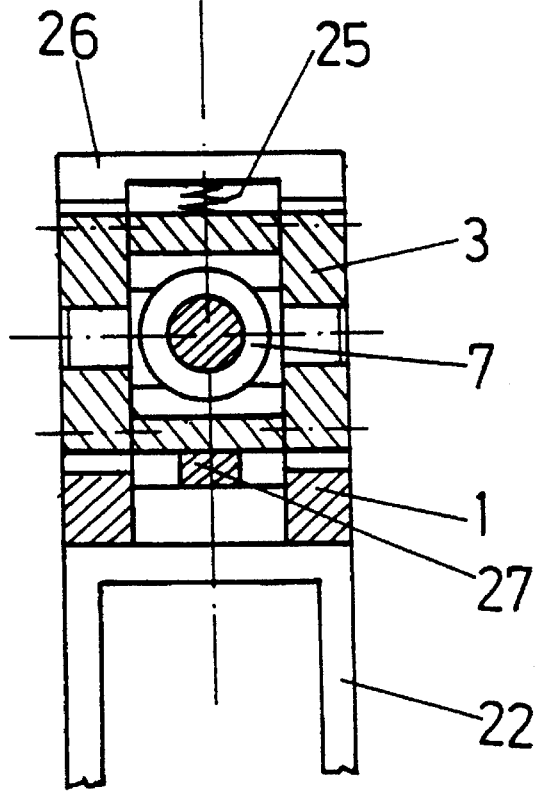
Figure 14:
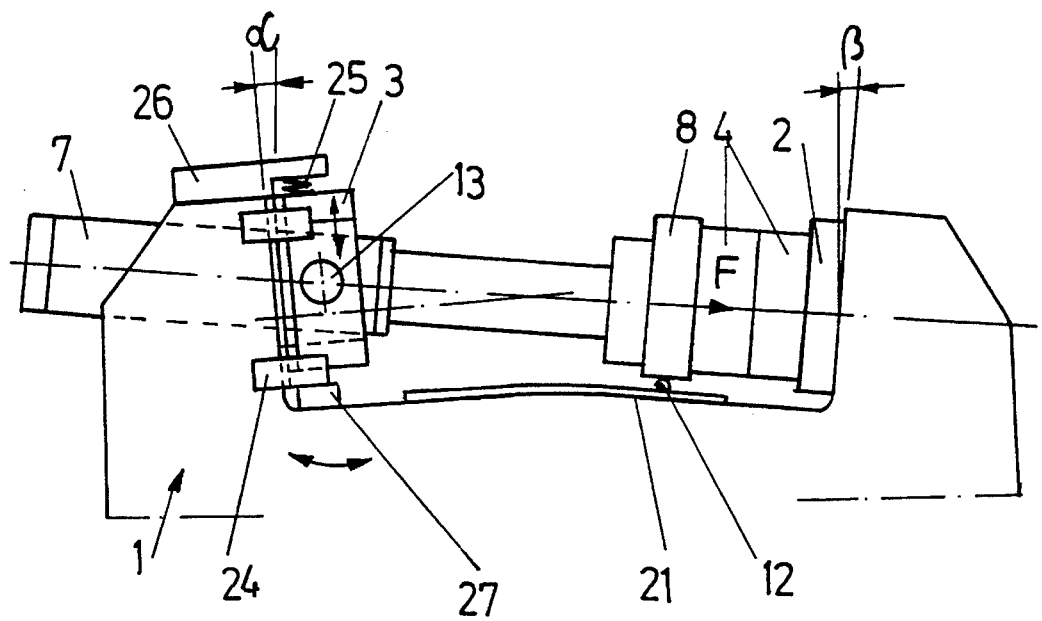
FIG. 14 shows a side view of the closing device when the mould is closed, with full build-up of closing force.

In the embodiment according to FIGS. 10 to 15 the piston-cylinder unit 7 with a hinge 13 is mounted in the cylinder plate 3 as shown in FIG. 10. The cylinder tube of the piston-cylinder unit 7 and the hinge pins are preferably manufactured from one piece (spheroidal graphite iron) (see FIG. 12). The cylinder plate 3 can be displaced parallel to the contact surface on the slide plate 23 on the machine frame 1 and is prevented from lifting off by retaining plates 24 during opening of the tool 4. As shown in FIG. 14, the piston-cylinder unit can be inclined by means of the hinge 13 while the cylinder plate 3 is displaced, so that parallelism of the platens is retained and the closing force F is vertical with respect to the plane of separation of the tool, even when the machine frame 1 is deformed. A return spring 25 which is supported on a supporting plate 26 ensures that the cylinder plate 3 is returned to the stop 27 when the tool is opened. The parallelism of the platens can be set very exactly (deviation $\leq 0.03$ mm) with the aid of support for the platens, for example a bearing shoe 12. In the piston-cylinder unit 7 the piston rod 5 is mounted within the cylinder with a very long guide, which guarantees the axial position between the cylinder and pistons during rotation and displacement.

Figure 15:
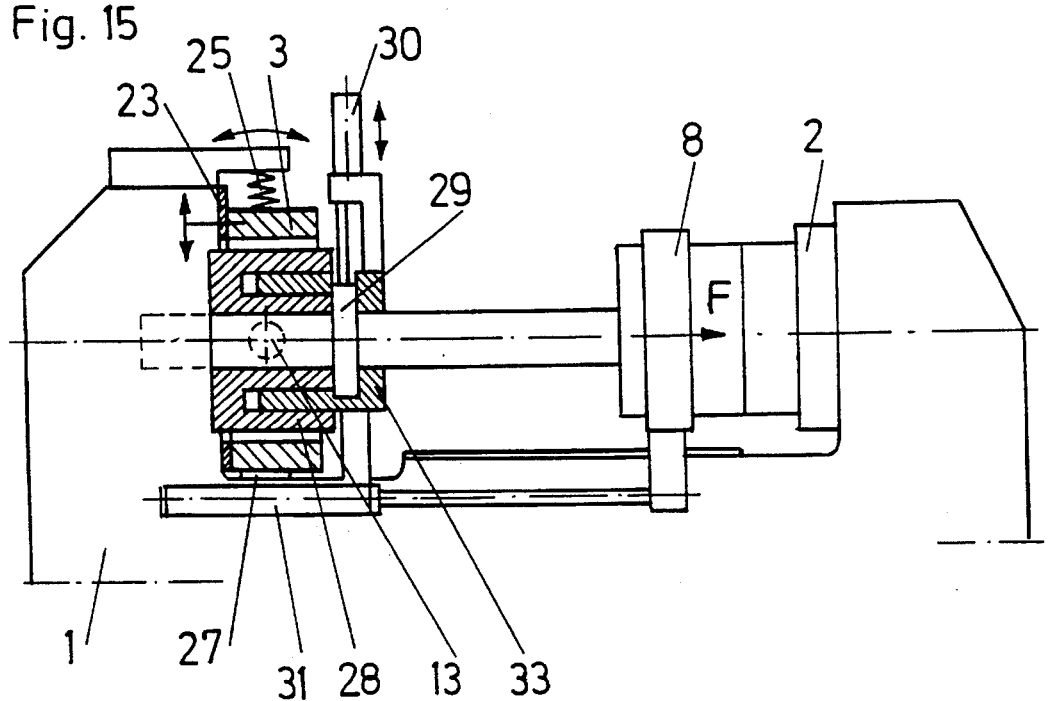
FIG. 15 shows a side view of the closing device in which the piston-cylinder unit is configured as a pressure pad, FIGS. 16 and 17 each show a side view of an injection moulding machine with a further possibility for the rotatable and displaceable mounting of the piston-cylinder unit.

FIG. 15 shows an embodiment in which the piston-cylinder unit 7 is configured as a pressure pad. The annular pressure pad cylinder 28 is mounted with the rotary hinge 13 in the cylinder plate 3. The press plate 29 is displaced with the cylinder 30. When the press plate 29 is extended the supporting piston can sink into the bore of the annular pressure pad cylinder 28 and the tool 4 can be opened by the driving cylinder 31. When the tool 4 is closed the press plate 29 is withdrawn and the closing force is produced by the ring piston 33. With this, the supporting piston is supported on the press plate 29 and transfers the closing force F via the moveable die platen 8 to the tool 4.

During build-up of closing force the annular pressure pad cylinder 8 rotates in the hinge 13 and the cylinder plate 3 is displaced on the slide plate 23, whereby the reliable closing shut of the tool 4 during the entire injection process is guaranteed. The different heights of the tool can be compensated for by the lifting of the pressure pad or by an alteration in the length of the supporting piston. The system is also provided with a return spring 25 and a stop 27.

Figure 16:
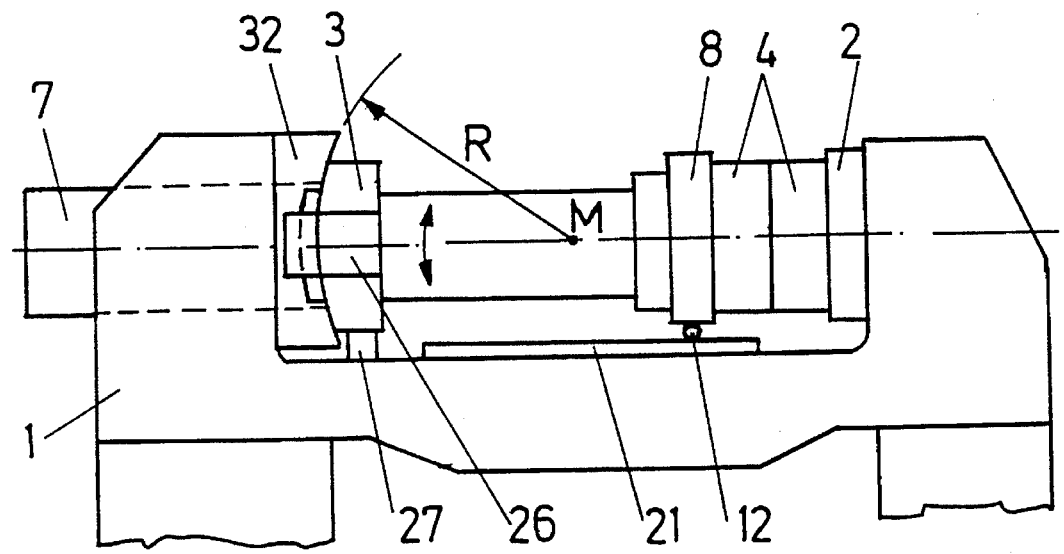
Figure 17:
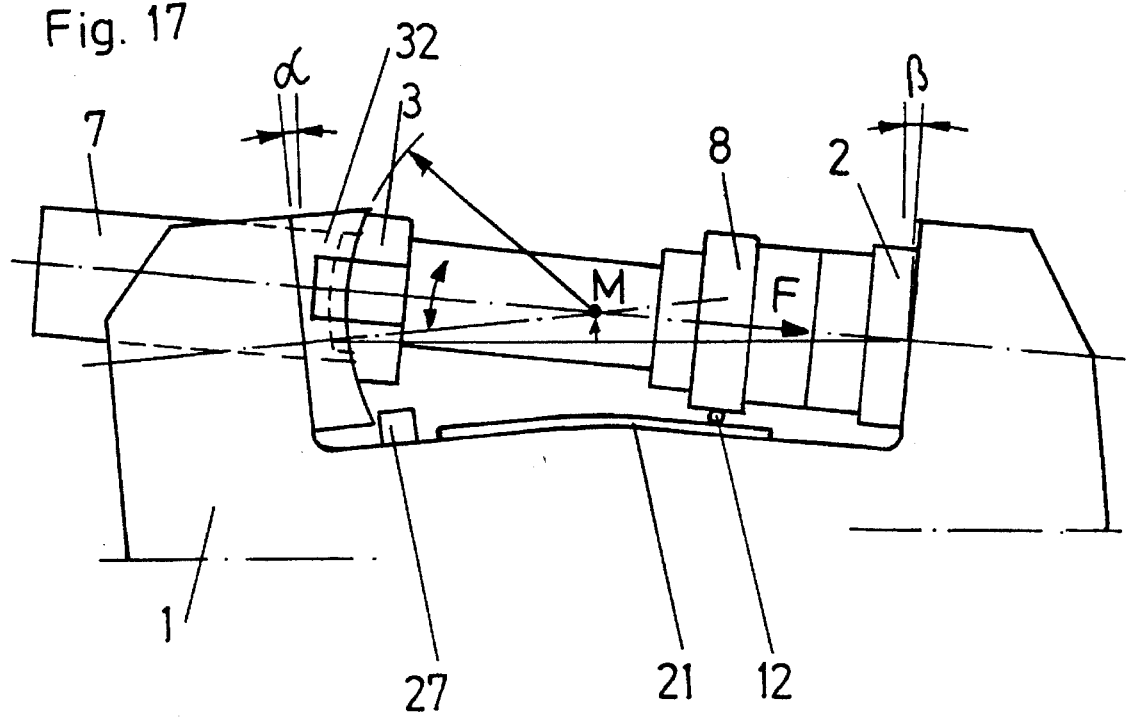
Figure 18:
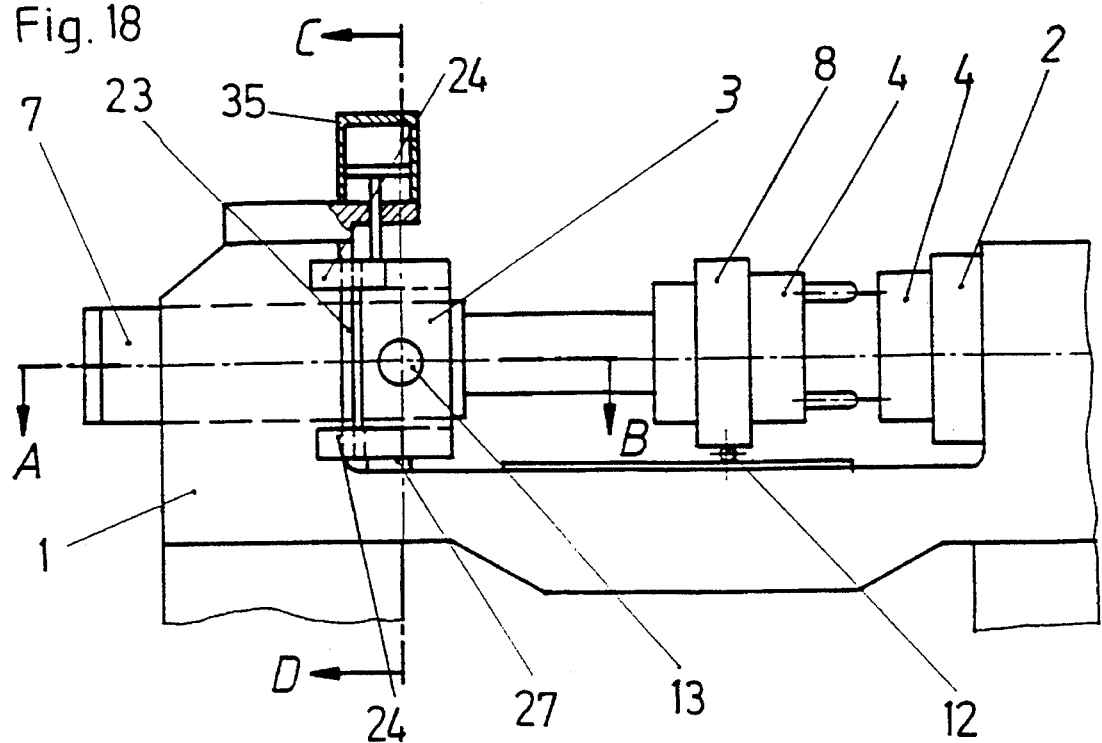
Figure 19:
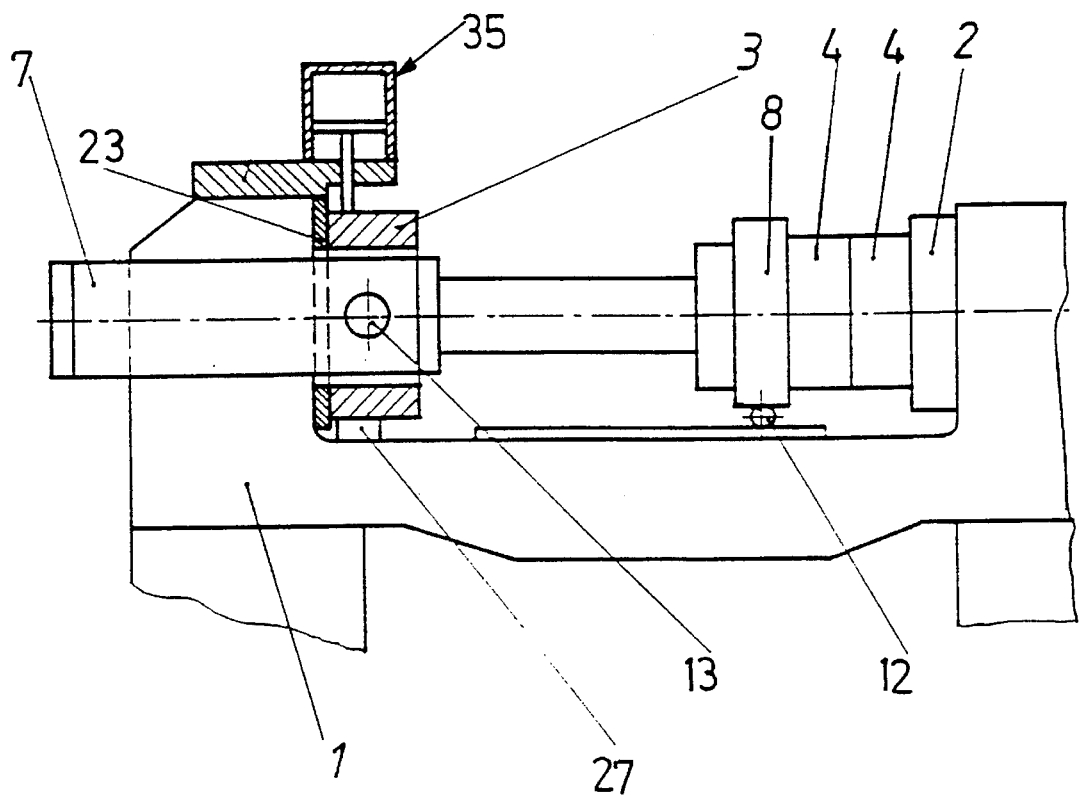
Figure 20:
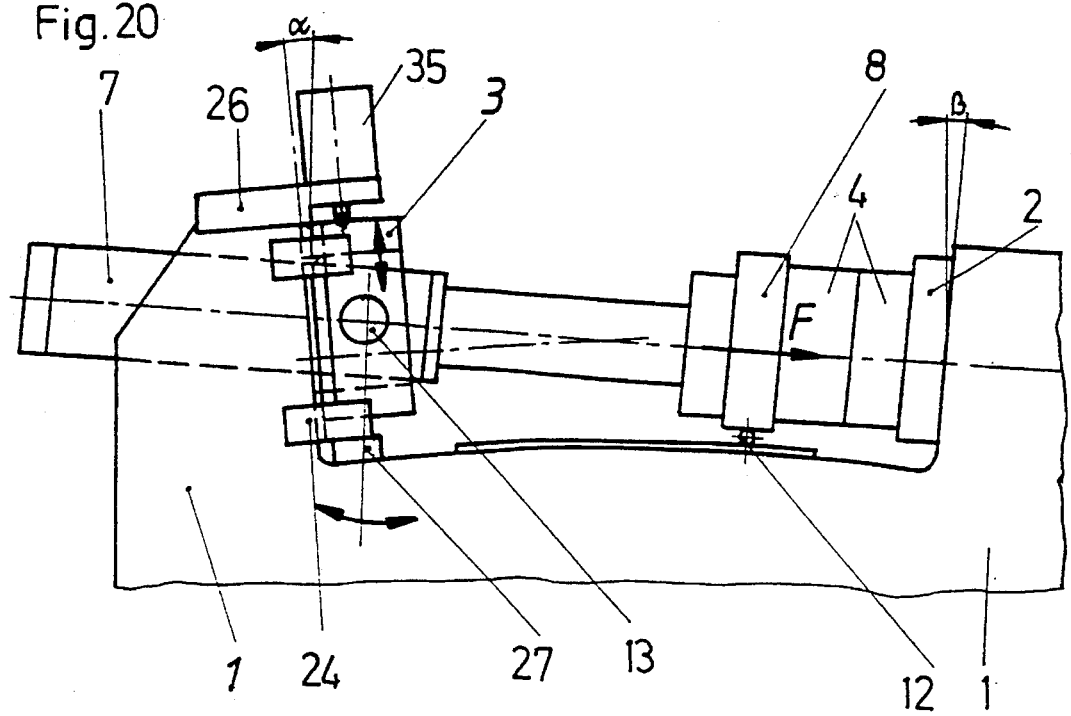
Figure 21:
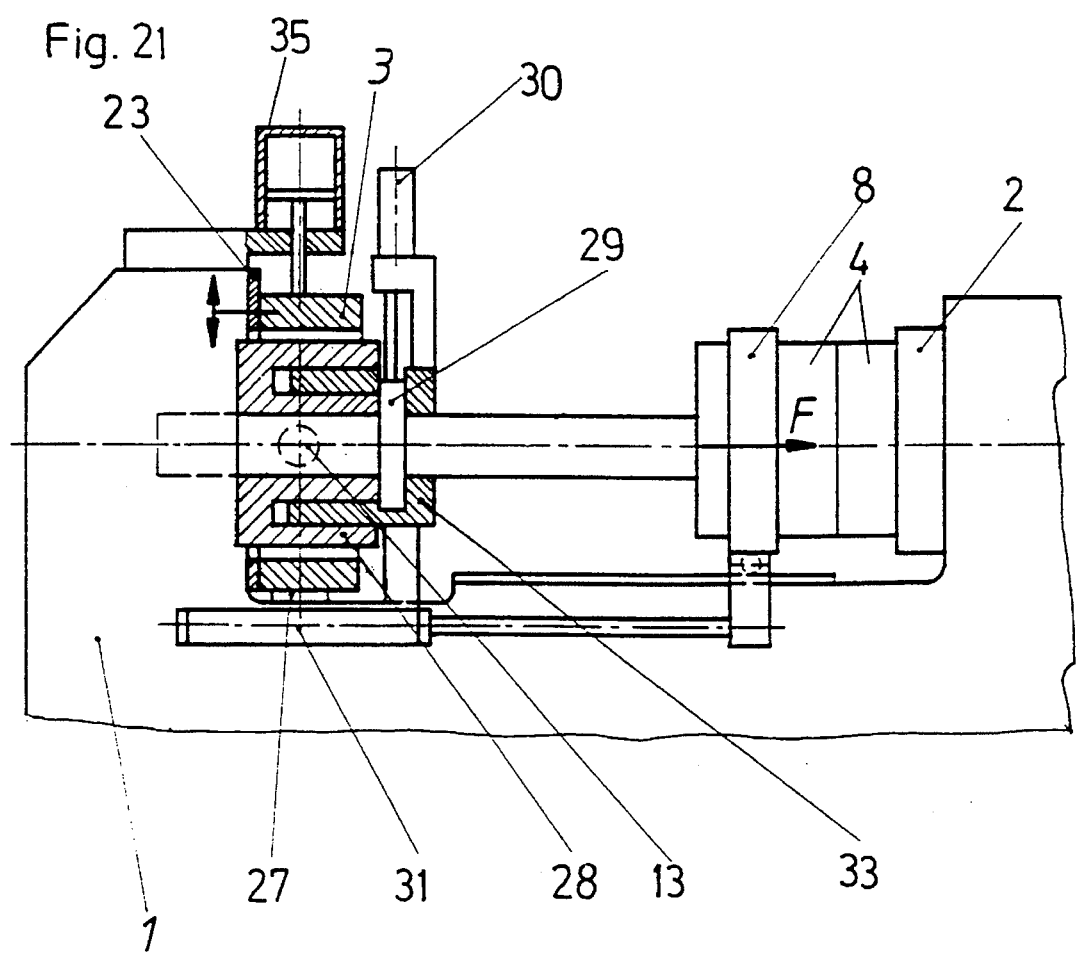

FIGS. 16 and 17 show another possibility for the rotatable and displaceable mounting of the piston-cylinder unit 7. The cylinder plate 3 is provided with a radius R, connected in a fixed manner to the piston-cylinder unit and mounted in a bearing plate 32, which is fixed to the machine frame 1. When the full closing force is applied the machine frame 1 is deformed and the piston-cylinder unit carries out a rotation and displacement by means of the cylindrical supporting surface of the cylinder plate 3. The machine frame 1 can be dimensioned so that when there is deformation, the central point M of the radius of curvature R lies at the point of intersection of the normals on the supporting surfaces of the bearing plate 32 and of the stationary die platen 2. In this way contact between the lines of the cylinder plate 3 and the bearing plate 32 is avoided. The return of the piston-cylinder unit 7 to the horizontal position when the tool 4 is open is also done by a spring element and is limited by the stop 27.

The embodiments according to FIGS. 18 to 23 are similar to the embodiments in FIGS. 10, 11 and 14, 17. However in addition a drive apparatus 35 is provided which supports or effects the displacement of the cylinder plate 3. This drive apparatus 35 is preferably formed by a hydraulic piston-cylinder unit which is mounted above the cylinder plate 3 on the machine frame 1.

By means of the drive apparatus 35 it is ensured that the vertical displacement of the cylinder plate 3 is effected even with a high degree of friction between the cylinder plate 3 and the slide plate 23.

Naturally, the drive apparatus 35 could also be configured as a mechanical apparatus, for example a spindle drive.

It is substantive that by means of the configuration according to the invention of the closing unit of an injection moulding machine the space between the die platens 2, 8 is free and therefore the half-moulds 4 are easily accessible.

We claim:

1. Injection moulding machine with a machine frame, one stationary and one movable die platen and, a hydraulic or electro-mechanical closing mechanism carried on an end plate of the machine frame, said closing mechanism being provided with a closing piston moveable with respect to the end plate, the closing mechanism for displacing the movable die platen on guide rails provided on the machine frame, wherein the end plate upon which the moveable die is supported and the stationary die platen are connected exclusively by the machine frame, and the die platens locked together are inclined, under the influence of the closing mechanism, slightly out of a plane perpendicular to the machine frame, and a hinge is provided near to the closing piston which joins together a hinge part assigned to the machine frame and a hinge part assigned to the moveable die platen, characterized in that, when hinged, apart from a tilting movement, the hinge part belonging to the movable die platen performs a radial displacement relative to the machine frame, the radial displacement directed preferably approximately normally to the longitudinal axis of the machine.

2. Injection moulding machine according to claim 1, characterized in that a point of intersection of a central longitudinal axis (LSK) of the closing piston with a central longitudinal axis (LBF) of the die platens lies on a rear portion of the moveable die platen and that a point of introduction of force from the closing piston into the moveable die platen is displaceable vertically relative to the moveable die platen.

3. Injection moulding machine according to claim 2, characterized in that during an injection process the point of intersection of the central longitudinal axis (LSK) of the closing piston with the central longitudinal axis (LBF) of the die platens lies over a main axis of the machine (MHA).

4. Injection moulding machine according to claim 2, characterized in that the closing piston carries a rolling element made of steel upon which the moveable die platen with a press plate is supported.

5. Injection moulding machine according to claim 4, characterized in that the closing piston is formed by a piston of a hydraulic cylinder.

6. Injection moulding machine according to claim 4, characterized in that the moveable die platen is connected to one of a coupling part connected to the rolling element and the piston by way of threaded bolts arranged in a central horizontal axis.

7. Injection moulding machine according to claim 4, characterized in that on a coupling part, a rotatable stop pin for the moveable die plate is arranged above the rolling element, and a return spring is arranged underneath the rolling element.

8. Injection moulding machine according to claim 1, characterized in that the hinge is formed by at least one vertical rail with a preferably T-shaped cross-section and a bearing shoe surrounding the rail in a form-fitting manner and with free play.

9. Injection moulding machine according to claim 8, characterized in that the rail is arranged on the moveable die platen and the bearing shoe is arranged on a part belonging to the closing mechanism.

10. Injection moulding machine according to claim 1, characterized in that between the piston of the closing mechanism and the moveable die platen a cylindrical or prismatic coupling part is arranged which is provided with a plurality of slits directed in opposite directions to one another, each slit penetrating approximately half of the cross-sectional area of the coupling part, and thus forming the hinge.

11. Injection moulding machine according to claim 1, characterized in that the end plate is a cylinder plate, the closing piston being located in the cylinder plate and mounted rotatably about a horizontal axis whereby the cylinder plate is displaceable parallel to a supporting surface on the machine frame.

12. Injection moulding machine according to claim 1 characterized, in that the closing piston is formed by a hydraulic piston-cylinder unit and the end plate is configured as a cylinder plate.

13. Injection moulding machine according to claim 12, characterized in that the cylinder plate with the piston-cylinder unit is returned to a stop by way of a return spring.

14. Injection moulding machine according to claim 11, characterized in that a pressure pad system in the cylinder plate is mounted rotatably about a horizontal axis and the cylinder plate is displaceable parallel with respect to the supporting surface on the machine frame.

15. Injection moulding machine according to claim 11, characterized in that a bearing plate is provided with a cylindrical supporting surface, said supporting surface engaging the cylinder plate.

16. Injection moulding machine according to claim 15, characterized in that during moulding, a center point (M) of a radius R of the cylindrical supporting surface coincides with a point of intersection of a first normal of the supporting surface and a second normal of a supporting surface of the stationary die platen.

17. Injection moulding machine according to claim 1, characterized in that the closing mechanism is oriented vertically.

18. Injection moulding machine according to claim 1, characterized by a drive apparatus applied to the hinge part connected to the moveable die platen, the drive apparatus for one of supporting and effecting displacement of the moveable die platen.

19. Injection moulding machine according to claim 18, characterized in that the drive apparatus is a hydraulic cylinder.

20. Injection moulding machine according to claim 18, characterized in that the drive apparatus is engaged with the cylinder plate.

21. Injection moulding machine according to claim 20, characterized in that the drive apparatus is mounted above the cylinder plate on the machine frame.

22. Injection moulding machine with a machine frame, one stationary and one moveable die platen and, a hydraulic or electro-mechanical closing mechanism carried on an end plate of the machine frame, the mechanism provided with a closing piston moveable with respect to the end plate, the closing mechanism for displacing the moveable die platen on guide rails provided on the machine frame, wherein the end plate upon which the moveable die is supported and the stationary die platen are connected exclusively by the machine frame and the die platens locked together are inclined, under the influence of the closing mechanism, slightly out of a plane perpendicular to the machine frame, and hinge means for connecting the closing mechanism to the moveable die platen, wherein the hinge means comprises a deformable element, the element for being deformed when a closing force is applied by the closing mechanism in order to allow a tilting movement between the moveable die platen and the closing mechanism.

* * * * *